United States Patent
Sheikh et al.

(10) Patent No.: US 6,298,409 B1
(45) Date of Patent: Oct. 2, 2001

(54) SYSTEM FOR DATA AND INTERRUPT POSTING FOR COMPUTER DEVICES

(75) Inventors: Tahir Q. Sheikh, Fremont; Walter A. Wallach, Los Altos, both of CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/048,818

(22) Filed: Mar. 26, 1998

(51) Int. Cl.⁷ .................................................. G06F 13/24
(52) U.S. Cl. ..................... 710/260; 710/8; 710/20; 710/40; 710/62; 710/100; 710/107; 710/128; 710/129; 710/266; 710/268; 712/11; 712/15; 712/20; 712/29
(58) Field of Search .................... 710/260, 8, 128, 710/129, 20, 40, 100, 107, 113, 62, 116; 707/101; 709/400; 712/11, 15, 20, 29; 714/14, 12, 22, 11; 711/202

(56) References Cited

U.S. PATENT DOCUMENTS

| | | |
|---|---|---|
| 4,449,182 | 5/1984 | Rubinson et al. . |
| 4,527,237 * | 7/1985 | Frieder et al. ........................ 364/200 |
| 4,769,768 * | 9/1988 | Bomba et al. ........................ 710/268 |
| 4,835,737 | 5/1989 | Herrig et al. . |
| 4,949,245 | 8/1990 | Martin et al. . |
| 4,999,787 | 3/1991 | McNally et al. . |
| 5,175,825 * | 12/1992 | Starr ....................................... 709/213 |
| 5,210,855 | 5/1993 | Bartol . |
| 5,269,011 | 12/1993 | Yanai et al. . |
| 5,272,584 | 12/1993 | Austruy et al. . |
| 5,287,537 * | 2/1994 | Newmark et al. ...................... 712/29 |
| 5,317,693 | 5/1994 | Cuenod et al. . |
| 5,317,747 | 5/1994 | Mochida et al. ...................... 395/725 |
| 5,329,625 | 7/1994 | Kannan et al. . |
| 5,337,413 | 8/1994 | Lui et al. . |
| 5,353,415 * | 10/1994 | Wolford et al. ....................... 710/126 |

(List continued on next page.)

Primary Examiner—Ayaz Sheikh
Assistant Examiner—Frantz B. Jean
(74) Attorney, Agent, or Firm—Knobbe Martens Olson & Bear LLP

(57) ABSTRACT

A system for monitoring issuance of interrupt and transaction commands without involving central processor units of computer systems. The system employs a fabric controller to manage transaction commands among and host devices. The system employs an interrupt controller to manage interrupt commands issued by devices. The system further employs a concurrent bridge to support communication between the controllers and at least one host device. With this system, congestion due to control and data traffic is minimized and a more efficient operation of central processor units is achieved.

17 Claims, 3 Drawing Sheets

U.S. PATENT DOCUMENTS

| | | | |
|---|---|---|---|
| 5,386,567 | 1/1995 | Lien et al. . | |
| 5,446,910 | 8/1995 | Kennedy et al. | 395/800 |
| 5,483,419 | 1/1996 | Kaczeus, Sr. et al. . | |
| 5,493,574 | 2/1996 | McKinley . | |
| 5,493,666 | 2/1996 | Fitch . | |
| 5,517,646 | 5/1996 | Piccirillo et al. . | |
| 5,539,913 | 7/1996 | Furuta et al. | 395/825 |
| 5,555,510 | 9/1996 | Verseput et al. . | |
| 5,564,024 | 10/1996 | Pemberton . | |
| 5,568,610 | 10/1996 | Brown . | |
| 5,568,614 * | 10/1996 | Mendelson et al. | 709/231 |
| 5,579,491 | 11/1996 | Jeffries et al. . | |
| 5,581,712 | 12/1996 | Herrman . | |
| 5,588,144 | 12/1996 | Inoue et al. . | |
| 5,606,672 | 2/1997 | Wade . | |
| 5,608,876 | 3/1997 | Cohen et al. . | |
| 5,615,207 | 3/1997 | Gephardt et al. . | |
| 5,632,021 | 5/1997 | Jennings et al. . | |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,664,119 | 9/1997 | Jeffries et al. . | |
| 5,675,807 * | 10/1997 | Iswandhi et al. | 710/260 |
| 5,680,288 | 10/1997 | Carey et al. . | |
| 5,687,381 * | 11/1997 | Swanstrom et al. | 710/269 |
| 5,696,970 | 12/1997 | Sandage et al. . | |
| 5,726,506 | 3/1998 | Wood . | |
| 5,740,378 | 4/1998 | Rehl et al. . | |
| 5,747,889 | 5/1998 | Raynham et al. . | |
| 5,748,426 | 5/1998 | Bedingfield et al. . | |
| 5,754,797 | 5/1998 | Takahashi . | |
| 5,754,884 * | 5/1998 | Swanstrom et al. | 710/22 |
| 5,761,033 | 6/1998 | Wilhelm . | |
| 5,761,045 | 6/1998 | Olson et al. . | |
| 5,761,427 * | 6/1998 | Shah et al. | 709/223 |
| 5,764,968 | 6/1998 | Ninomiya . | |
| 5,765,198 | 6/1998 | McCrocklin et al. . | |
| 5,768,541 | 6/1998 | Pan-Ratzlaff . | |
| 5,768,542 | 6/1998 | Enstrom et al. . | |
| 5,781,767 | 7/1998 | Inoue et al. . | |
| 5,781,798 | 7/1998 | Beatty et al. . | |
| 5,784,576 | 7/1998 | Guthrie et al. . | |
| 5,790,831 | 8/1998 | Lin et al. . | |
| 5,793,987 | 8/1998 | Quackenbush et al. . | |
| 5,794,035 | 8/1998 | Golub et al. . | |
| 5,796,185 | 8/1998 | Takata et al. . | |
| 5,796,981 | 8/1998 | Abudayyeh et al. . | |
| 5,798,828 | 8/1998 | Thomas et al. . | |
| 5,799,036 | 8/1998 | Staples . | |
| 5,802,269 | 9/1998 | Poisner et al. . | |
| 5,802,393 | 9/1998 | Begun et al. . | |
| 5,802,552 | 9/1998 | Fandrich et al. . | |
| 5,805,834 | 9/1998 | McKinley et al. . | |
| 5,809,224 | 9/1998 | Schultz et al. . | |
| 5,812,757 | 9/1998 | Okamoto et al. . | |
| 5,812,858 | 9/1998 | Nookala et al. . | |
| 5,815,117 | 9/1998 | Kolanek . | |
| 5,822,547 | 10/1998 | Boesch et al. . | |
| 5,838,935 * | 10/1998 | Davis et al. | 710/129 |
| 5,857,083 * | 1/1999 | Venkat | 710/129 |
| 5,878,237 * | 3/1999 | Olarig | 710/128 |
| 5,890,002 * | 3/1999 | Li et al. | 710/260 |
| 5,906,659 * | 5/1999 | Derrick et al. | 710/52 |
| 5,913,045 * | 6/1999 | Gillespie et al. | 710/129 |
| 5,923,887 * | 7/1999 | Dutton | 710/260 |
| 5,953,538 * | 9/1999 | Duncan et al. | 710/22 |
| 6,020,881 * | 2/2000 | Naughton et al. | 345/327 |
| 6,061,794 * | 5/2000 | Angelo et al. | 713/200 |

* cited by examiner

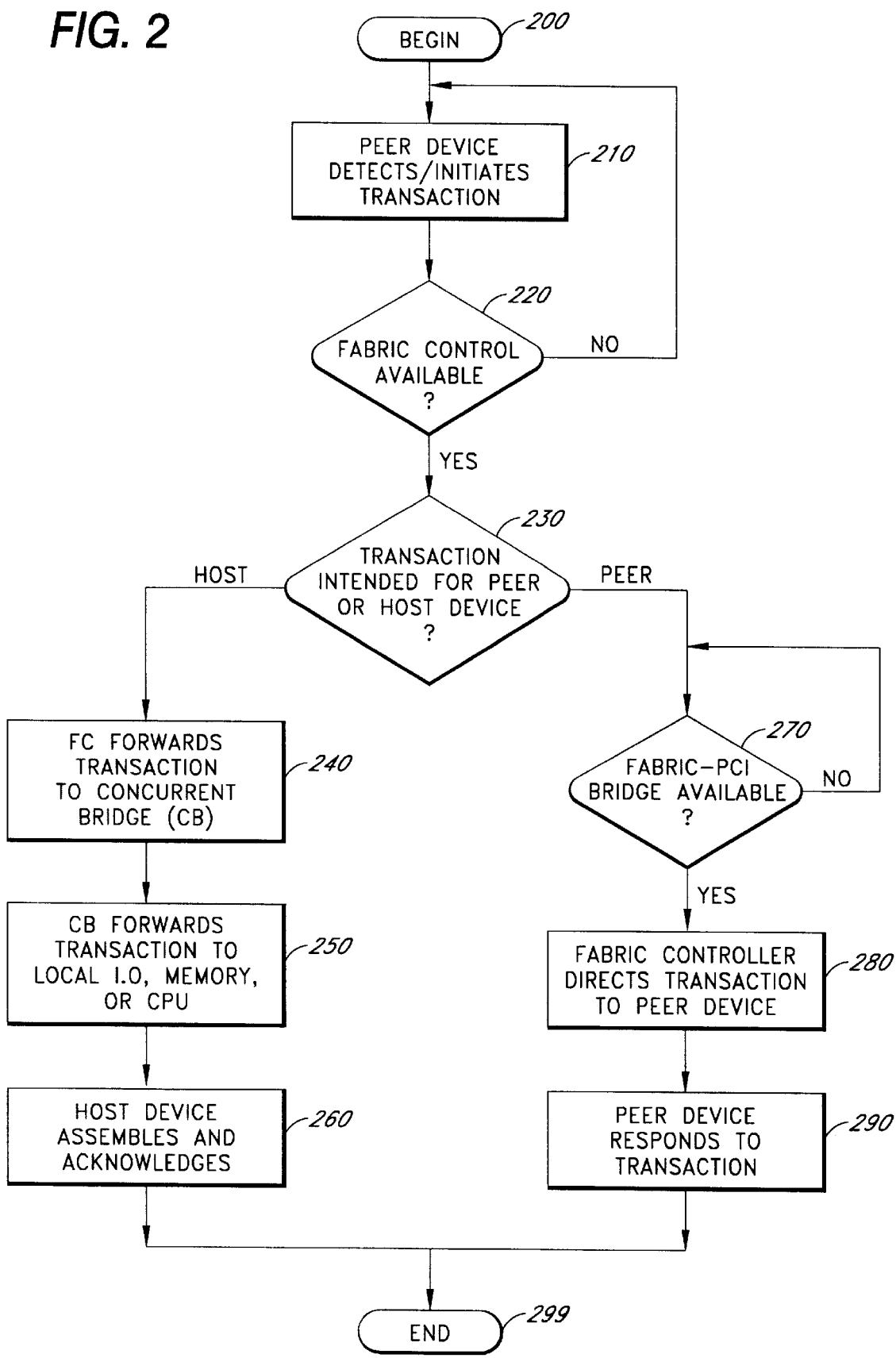

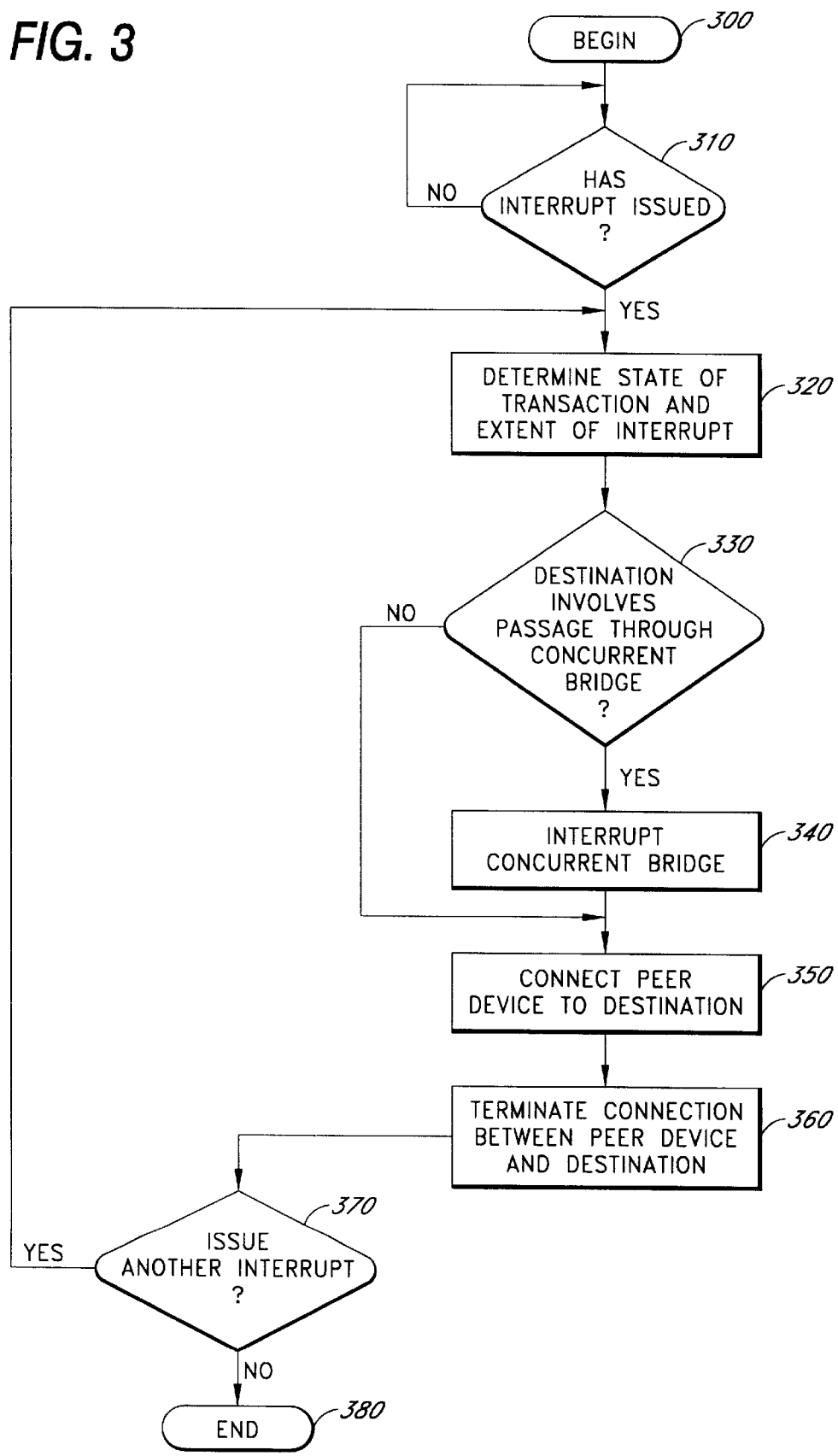

SYSTEM FOR DATA AND INTERRUPT POSTING FOR COMPUTER DEVICES

RELATED APPLICATIONS

The subject matter of U.S. Patent Application entitled METHOD OF DATA AND INTERRUPT POSTING PROTOCOL FOR COMPUTER DEVICES, filed on even date herewith, application Ser. No. 09/048,909.

BACKGROUND OF THE INVENTION

1. Field of the Invention

The invention relates generally to data processing within information processing systems. More particularly, this invention relates to inter-device communication within a computer system.

2. Description of the Related Art

Information processing systems, such as personal computers (PCs), have virtually become an inseparable part of everyone's daily activities. These systems process an enormous amount of information in a relatively short time. To perform these sophisticated tasks, a computer system typically includes a central processor, memory modules, various system and bus control units, and a wide variety of peripheral data input/output (I/O) and storage devices. As used in this disclosure, the term "computer" includes any system which processes information. These computer components communicate using control and data signals having various data rates and signal protocols over multiple system buses.

Examples of such system buses include a peripheral component interconnect ("PCI") bus, a scaleable coherent interface ("SCI") bus, and a high performance parallel interface ("HIPPI") bus. The PCI bus is a 32-bit or 64-bit bus with multiplexed address and data lines. The bus is intended for use as an interconnect mechanism between highly integrated peripheral controller components, peripheral add-in boards, and processor/memory devices. In some applications, the SCI bus uses point-to-point links and a packet protocol to support 64-bit physical addresses. The upper 16 bits of the 64-bit address specify a node number and the lower 48 bits of the 64-bit address specify an offset address. The SCI bus uses coaxial cables over medium distances (e.g., 10's of meters) and fiber optics over long distances (e.g., 10 km) to provide unidirectional point-to-point signaling, from a transmitting device (i.e., transmitter) to a receiving device (i.e., receiver), to simulate a bus. The SCI bus supports read and write transactions among the various devices within a computer system. A transaction includes request and response subactions. The request subaction transfers an address and a command (read or write), whereas the response subaction returns status. For a write transaction, data are included within the request packet. For a read transaction, data are included within the response packet. For a compound transaction (e.g., fetch and add), data are included within the request and response packets.

The HIPPI protocol supports bus communication over a simplex channel (point-to-point link) for transferring data in one direction. In some applications, the HIPPI bus uses a parallel data path to provide communication at 800 Mbps with a 32-bit data bus, and 1.6 Gbps with a 64-bit data bus. The HIPPI bus performs data transfers and flow control in increments of bursts, with each burst nominally containing 256 words (i.e., 1024 or 2048 bytes). The HIPPI bus provides error detection by using byte parity on the data bus, and immediately following each burst of data with a length/longitudinal redundancy checkword (LLRC). HIPPI framing protocol (FP) defines the framing for packets that will be sent over a HIPPI connection. Basically the HIPPI-FP standard splits a packet in three areas: Header_Area, D1_Area, and D2_Area. Each of these areas starts and ends on a 64-bit boundary. The Header_Area defines the sizes and offsets of the D1_Area and D2_Area. The D1_Area contains control information and the D2_Area contains data associated with the control information.

Despite the transfer power of these communication protocols, data and control traffic among computer devices is still prevalent. Bottlenecks of data and control traffic among central processing units ("CPUs"), memory devices, and external media all adversely affect processing speeds and efficiency rates of computer systems. Data and control transactions are often limited to a common path used by all devices in the system. For instance, data traffic for devices on various input/output ("I/O") buses travels through the host processor bus. Additionally, all communications among peer devices travel through the host processor bus. Peer devices on the PCI bus may include one or more of the following: an audio card, a motion video card, a small computer system interface (SCSI) card, a graphics card, or other PCI—PCI bridges. For each transaction, a peer device may issue one or more interrupts to the processor to communicate to another device in the system. The frequency of interrupts results in unnecessary and often excessive data traffic on the host processor bus. More importantly, the involvement of the CPU in the management of these transactions slows computer processing speeds significantly.

Several attempts have been made in the field to resolve the bottleneck of traffic resulting from the above-described common path. Some of these attempts include employing data paths having higher data rate capacity, or widening data path bandwidths to support higher data throughput on the bus. These solutions, however, are often costly and, more importantly, limited by the capacity of the employed data path. Therefore, there is a need in the computer technology to manage device interrupts more effectively. The solution should provide a more efficient utility of CPUs while continuing to meet the demands of increasing control and data traffic.

SUMMARY OF THE INVENTION

To overcome the limitations of the related art, the invention provides a system for posting data and interrupt transactions for devices and local subsystems in a computer system. A local subsystem may include one or more peer devices. The invention provides a fabric controller, a concurrent bridge, and an interrupt controller to alleviate the need of burdening the CPU with every transaction in the system. Accordingly, unnecessary control and data flow through the host processor bus is minimized.

According to one embodiment of the invention, a system for managing a transaction initiated by a device is provided. The system comprises a central processor, and a bridge, electrically coupled to the device, which supports communication between the device and at least one other device. The system further comprises a controller, electrically coupled to the bridge, which forwards a transaction command to its destination. In another embodiment, a system for managing an interrupt issued by a device requesting communication with another device is provided. The system comprises a central processor, and a controller, electrically coupled to the central processor, which monitors issuance of the interrupt. The controller establishes a data path between the device and the other device.

In another embodiment, a system for managing a transaction initiated by a device comprises a bridge, electrically connected to the device, which enables communication between the device and at least one other device. The system further comprises a first controller, electrically connected to the device, which manages the transaction. The system further comprises a second controller, electrically connected to the device, which manages the interrupt, and a concurrent bridge, electrically connected to the first and second controllers, which supports communication between the first and second controllers and at least one host device.

BRIEF DESCRIPTION OF THE DRAWINGS

The above and other aspects, features and advantages of the invention will be better understood by referring to the following detailed description, which should be read in conjunction with the accompanying drawings, in which:

FIG. 2 is a flow chart describing the decisional steps of one embodiment of the Fabric Controller.

FIG. 3 is a flow chart describing the decisional steps of one embodiment of the interrupt controller.

DETAILED DESCRIPTION OF THE INVENTION

Figure 1:
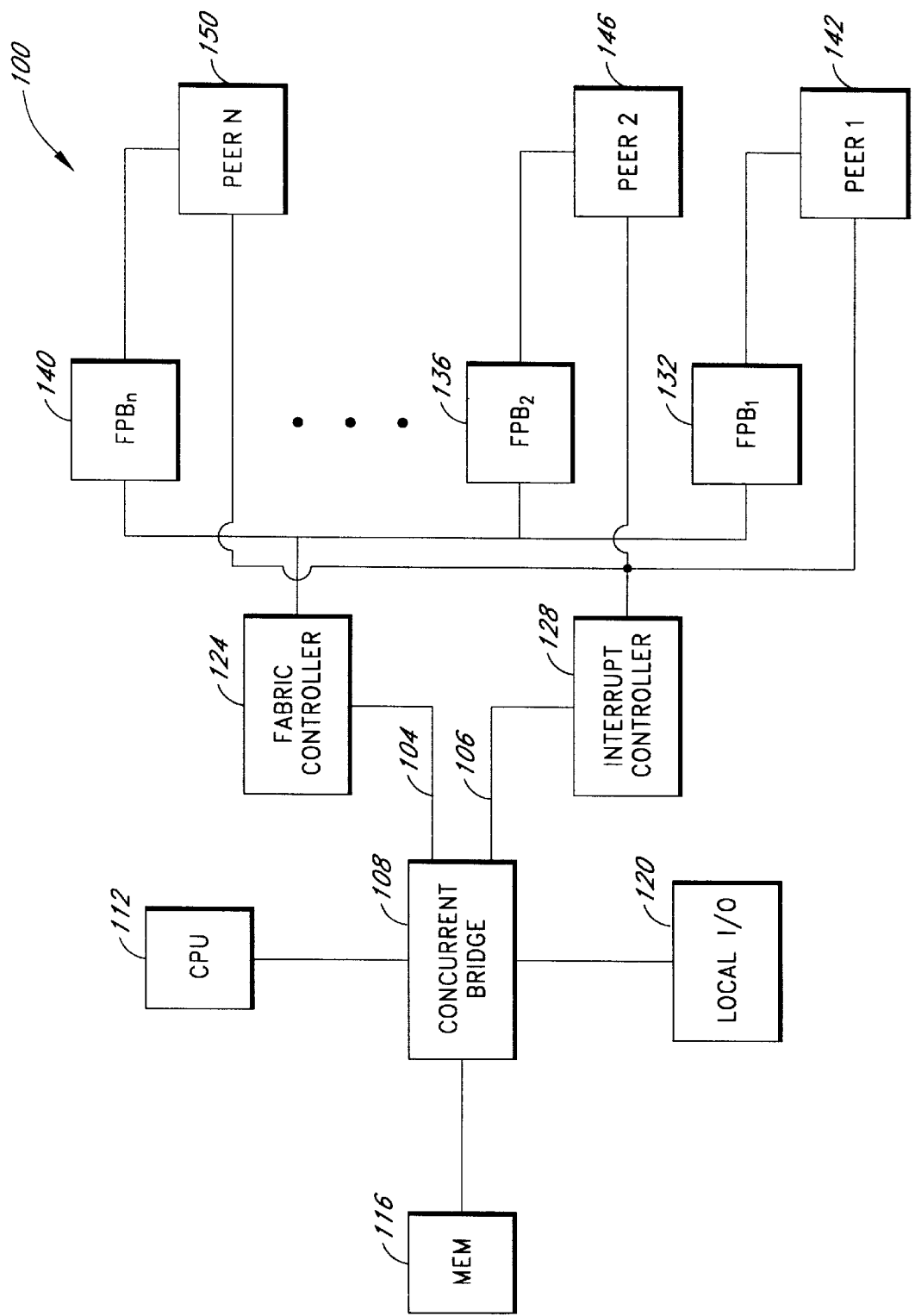
FIG. 1 is a functional block diagram of a computer system employing one embodiment of the invention.

The invention provides a system for posting data and interrupt transactions for devices in a computer system. The system employs a fabric controller, a concurrent bridge, and an interrupt controller to alleviate the need of burdening the CPU with every transaction in the system. Accordingly, unnecessary control and data flow through the host processor bus is minimized. Additionally, by directing necessary transactions to the CPU, concurrent data and control transactions in a single system are supported.

FIG. 1 shows a functional block diagram of a computer system employing one embodiment of the invention. As shown in FIG. 1, a computer system 100 comprises a plurality of host devices communicating via a concurrent bridge 108 using standard I/O data buses. These host devices include, for example, a central processing unit ("CPU") 112, one or more memory units 116, and a local input/output ("I/O") interface 120 for connecting one or more local I/O devices. The invention is implemented independently of the bus protocol used. Accordingly, the concurrent bridge (CB) bus 104 may be one of a variety of bus protocols which are well known in the art. For example, in one embodiment, the CB bus 104 may be a scaleable coherent interface ("SCI") bus, or a high performance parallel interface ("HIPPI") bus. A fabric controller 124 is connected to the CB 108 via a data port (not shown) to manage the flow of transaction requests among peer devices, and among peer and host devices. Additionally, an interrupt controller 128 is connected to the CB 108 via a control port 106 to manage the flow of interrupt activity among peer devices, and among peer and host devices. The design of the CB 108, fabric controller 124, and interrupt controller 128 may be based on an application specific integrated circuit (ASIC).

The CB 108 includes four data ports to connect the CPU 112, memory 116, local I/O 120, and the fabric controller 124. The CB 108 further includes a control port 106 to connect the interrupt controller 128 to other host devices. The CB 108 establishes communication for up to two links simultaneously. As used in this patent document, a link refers to an internal connection between two ports within the CB 108. Hence, for example, the CPU 112 may communicate with the Local I/O 120, while the fabric controller 124 accesses the memory 116 simultaneously. In addition to its ability to establish concurrent links, the CB 108 includes an arbiter which coordinates access by competing devices to same resources. The CB 108 may utilize an internal pipeline buffer (not shown) to coordinate access to the same resource. Hence, for example, if the fabric controller 124 is communicating to the memory 116 and the CPU 112 requests access to write into the memory 116 at the same time, the CB 108 allows the CPU 112 to write into the pipeline buffer of the CB 108. After the fabric controller 124 completes its communication with the memory 116, the CB 108 writes data stored in its pipeline buffer into the memory 116. Hence, the CB 108 provides virtual access by competing devices to the same resource simultaneously.

In addition to the main host bus, computer systems typically include other buses to support communication among peripheral devices, and between the CPU 112 and peripheral devices. One very common bus is the peripheral component interconnect ("PCI") bus which supports communication by PCI devices to host and other devices in the system. A plurality of fabric-PCI bridges ("FPBs") provide bus protocol conversion to connect PCI buses to the CB bus 104. In this embodiment, a FPB1 132, FPB2 136, and FPBn 140 are connected to the CB bus 104 to provide communication for a plurality of PCI devices. As noted above, typical PCI devices ("peer devices") include an audio card, a motion video card, a local area network (LAN) interface, a SCSI card, an expansion bus interface, a graphics card, or other PCI—PCI bridges. As shown in FIG. 1, peer devices resident on PCI buses include Peer1 142, Peer2 146, and PeerN 150. Data and control traffic transmitted by peer and host devices travel through, and under the management of, the fabric controller 124. Interrupt traffic transmitted by peer and host devices travels through, and under the management of, the Interrupt controller 128.

FIG. 2 is a functional flow chart describing the decisional steps of one embodiment of the fabric controller 124. The fabric controller 124 may be a processor-based unit which includes hardware and software in its design. The computer hardware architecture shown in FIG. 1 may be used as the basis for applying the decisional steps as executed by the fabric controller 124.

Typically, transaction requests by peer and host devices are issued continuously in the computer system 100. When a peer or host device is not issuing, receiving, or processing a transaction, the device is in an idle state as indicated at the beginning of the process at step 200. There are at least three identifiable categories of transactions in the system 100. The first category is known as a "local" transaction which includes transactions being issued by and processed within the peer device itself. The second category is known as a "global peer" transaction which includes transactions being issued by a peer device to one or more other peer devices for further action. A third category is known as a "global" transaction which includes transactions transferred between one or more peer devices and one or more host devices. More particularly, examples of a global transaction include a transfer between the CPU 112 and Peer 1 142, the memory 116 and Peer 1 142, and the local I/O 120 and Peer 1 142.

To perform its sophisticated management functions, the fabric controller 124 monitors the issuance, transfer, and completion of transactions using the following process. At step 210, a peer device detects or issues a transaction. The form of a transaction depends on the bus protocol employed among peer devices. In some bus protocols, the transaction command is communicated in the form of a packet. The packet includes, among other things, a source address, a destination address, a transaction address, a transaction type, one or more status bits, and one or more error correction bits (e.g., cyclic redundancy checksum CRC). A peer device (e.g., Peer1 142 of FIG. 1) may detect a transaction command which is received from another device or, alternatively, issued by Peer1 142 itself. At step 220, Peer1 142 checks for the availability of the fabric controller 124 for managing the transaction command being issued or transferred. Typically, Peer1 142 sends a synchronizing packet to establish a handshake with the fabric controller 124, and waits for an acknowledgment packet from the fabric controller 124. If the fabric controller 124 is not available, then Peer1 142 waits for the fabric controller 124 to send the acknowledgment packet to Peer1 142. The waiting arises when the fabric controller 124 is managing other transaction commands from other devices in the system. When the fabric controller 124 becomes available, then at step 230, the fabric controller 124 issues an acknowledgment packet to and receives the transaction command from Peer1 142 via the FPB1 132. As noted above, the transaction command may be a read, write, or a compound subaction. The fabric controller 124 determines the intended destination of the transaction command pursuant to the destination address field in the packet.

If the transaction command is intended for a host device, then at step 240, the fabric controller 124 forwards the transaction command to the CB 108 (FIG. 1) for further action. At step 250, the CB 108, in turn, forwards the transaction command to its intended destination (e.g., CPU 112, memory unit 116, or local I/O interface 120) for processing. At step 260, the recipient host device returns a response packet to the issuing device to acknowledge that the transaction command has been received for processing. If, on the other hand, the fabric controller 124 determines in step 230 that the transaction command is intended for another peer device, then the fabric controller 124 moves to step 270. At step 270, the fabric controller 124 checks for the availability of the fabric-PCI bridge (e.g., FPB2 136) to which the intended peer device (e.g., Peer2 146) is connected. If the FPB2 136 is not available, the fabric controller 124 waits until it receives an acknowledgment packet from the FPB2 136. When the FPB2 136 becomes available, the FPB2 sends an acknowledgment packet to the fabric controller 124 and, at step 280, the fabric controller 124 directs the transaction command to Peer2 146 via the FPB2 136 for further action. At step 290, the recipient peer device responds to the transaction command by returning a response packet acknowledging receipt of the transaction request. By forwarding the transaction request directly to the intended peer device without involving the CPU 112, the possibility of bottle neck traffic on the CB bus 104 is minimized. Moreover, concurrent transactions among host devices and among peer devices are supportable. The process terminates at step 299.

FIG. 3 is a flow chart describing the decisional steps of one embodiment of the interrupt controller 128 (FIG. 1). As shown in FIG. 3, at step 300, a typical interrupt process commences by setting the interrupt controller 128 in a "watchdog" state and waiting for the issuance of interrupts by one or more peer devices. At step 310, the interrupt controller 128 determines if an interrupt has been issued by a peer device. If no interrupt has been issued, the interrupt controller 128 returns to its watchdog state as described in step 300. If an interrupt is detected then, at step 320, the interrupt controller 128 analyzes the state of the current transaction, which is being performed by the interrupt-issuing peer device ("source peer device"). Additionally, in response to the interrupt request by the source peer device, the interrupt controller 128 determines whether to interrupt a destination peer device (i.e., the peer device targeted by the source peer device) and/or interrupt the CPU 112 ("speculative interrupt").

In analyzing the state of the current transaction, the interrupt controller 128 determines whether the transaction is in its early stages of execution or nearing completion. The interrupt controller 128 may evaluate one or more factors to assess the state of the current transaction. The factors may include, among other things, the destination address, transaction address, one or more status bits, and type of transaction. Hence, for example, a source peer device (e.g., Peer1 142) may request to read certain data (e.g., an image) from the memory 116. If the transaction address specifies a block of data at the end of the image data for this type of transaction, the interrupt controller 128 determines that the read transaction is nearing completion. Alternatively, a system operator may set a counter to a threshold rate to determine at which point (e.g., percentage) a transaction is nearing completion. For instance, if the image size is 8K, and Peer1 142 is reading the image data in blocks of 1K during each memory access, then the read transaction is nearing completion on the 8th access to memory. Therefore, if the interrupt controller determines that Peer1 142 is accessing the memory 116 for the 8th time, then the read transaction is nearing completion. If the transaction is nearing completion, the interrupt controller 128 may interrupt the CPU 112. Such interrupt may be necessary to prepare the CPU 112 for further action after the Peer1 142 completes executing its current transaction.

Moreover, in some instances, the interrupt controller 128 may interrupt the CPU 142 even when the transaction is not nearing completion. Such interrupt may be in response to an express request by the source peer device. Additionally, the interrupt controller 128 may interrupt the CPU 142 upon detecting an error in the transaction (e.g., a data overflow). In such case, the interrupt controller 128 interrupts the CPU 142 to take appropriate measures, e.g., instruct the source peer device to cancel or re-initiate the transaction.

At step 330, the interrupt controller 128 determines whether transaction packets sent by the source peer device to a destination device involve passage through the CB 108 (FIG. 1). Typically, a source peer device issues an interrupt command to communicate with another device in the system. More particularly, Peer1 142 issues an interrupt command indicating the address of the memory 116. Based on the address, the interrupt controller 128 determines whether interrupting the CB 108 is necessary to establish a data path between the Peer1 142 and the memory 116. Hence, if establishing a data path with the destination device involves passage through the CB 108, then at step 340, the interrupt controller 128 interrupts the CB 108 for this purpose.

On the other hand, if establishing a data path with the destination device does not involve passage through the CB 108, the interrupt controller 128 does not interrupt the CB 108. The process continues directly from step 330 to step 350. At step 350, the interrupt controller 128 establishes a data path between the Peer1 142 and the memory 116. The Peer1 142, in turn, reads the desired data from the memory 116. At step 360, the interrupt controller 142 terminates the data path between the peer device 142 and the memory 116. At step 370, the source device determines whether to issue another interrupt to communicate with another device. For instance, after reading and processing (e.g., expanding the image) the desired data, the peer device 142 may issue an interrupt to send out a request to write the processed (i.e., expanded image) data into another peer device (e.g., Peer2 146). Hence, if the Peer1 142 issues another interrupt to the interrupt controller 128, the process repeats at step 320. If, on the other hand, the Peer1 142 does not issue an interrupt to the interrupt controller 128, the process terminates at step 380.

In view of the foregoing, it will be appreciated that the invention overcomes the long-standing need for a system for managing data and interrupt commands issued by peer devices without the disadvantage of involving the central processor in every transaction. The invention ensures an effective utilization of central processors by minimizing unnecessary interruptions by other devices in a computer system. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which fall within the meaning and range of equivalency of the claims are to be embraced within their scope.

What is claimed is:

1. A system for managing a transaction initiated by a first device, the system comprising:
   a central processor configured to handle the transaction in response to issuance of an interrupt;
   a bridge electrically coupled to the first device, the bridge providing communication between the first device and at least a second device; and
   a controller electrically coupled to the bridge, the controller being configured to forward a transaction command to its destination, wherein the controller is further configured to determine if it is necessary to interrupt the central processor; and wherein the central processor is interrupted in the event that communication between the first device and the second device necessitates involving the central processor.

2. The system as defined in claim 1, wherein the controller determines if the transaction command is directed to the second device.

3. The system as defined in claim 1, wherein the controller forwards the transaction command to the second device if the transaction command is intended for the second device.

4. The system as defined in claim 1, further comprising a concurrent bridge electrically connected to the controller.

5. The system as defined in claim 4, wherein the controller forwards the transaction command to the concurrent bridge if the transaction is intended to a host device.

6. The system as defined in claim 1, wherein the controller communicates with the first device via the bridge.

7. A system for managing a transaction initiated by a first device, the system comprising:
   a central processor configured to handle the transaction in response to an interrupt issued in the event that communication between the first device and a second device necessitates involving the central processor;
   a first bridge electrically connected to the first device, the first bridge providing communication between the first device and at least the second device;
   a first controller electrically connected to the first device, the first controller being configured to manage the transaction;
   a second controller electrically connected to the first device, the second controller being configured to manage the interrupt initiated by the first device, wherein the controller is further configured to determine if it is necessary to interrupt the central processor; and
   a second bridge electrically connected to the first and second controllers, the second bridge providing communication between at least one of the first and second controllers and at least one host device.

8. The system as defined in claim 7, further comprising a central processor.

9. The system as defined in claim 7, wherein the first and second controllers are electrically connected to the second device.

10. In a computer system having a central processor and a controller determining if it is necessary to interrupt the central processor, a program storage device storing instructions that when executed by the computer perform a method of managing a transaction command initiated by a first device, the method comprising:
    issuing the transaction to a second device;
    establishing a handshake between the first device and the controller;
    interrupting the central processor in the event that communication between the first and second devices necessitates involving the central processor; and
    forwarding the transaction command to the second device.

11. The storage device as defined in claim 10, wherein the act of checking for availability of the controller includes the act of communicating to a bridge.

12. The storage device as defined in claim 10, wherein the act of determining the intended destination includes the act of determining if the transaction command is directed to the second device.

13. The storage device as defined in claim 12, wherein the method includes the act of forwarding the transaction command to the second device if the transaction command is intended for the second device.

14. The storage device as defined in claim 13, wherein the method includes the act of forwarding the transaction command to a bridge.

15. The storage device as defined in claim 10, wherein the method includes the act of determining if the transaction command is directed to a host device when performing the act of determining intended destination of the transaction command.

16. The storage device as defined in claim 15, wherein the method includes the act of forwarding the transaction command to a host device if the transaction command is intended for the host device.

17. The storage device as defined in claim 16, wherein the method includes the act of forwarding the transaction command to a bridge.

* * * * *